(12) United States Patent
Lee et al.

(10) Patent No.: US 11,578,175 B2
(45) Date of Patent: Feb. 14, 2023

(54) PREPARATION METHOD OF SUPER ABSORBENT POLYMER

(71) Applicant: LG Chem, Ltd., Seoul (KR)

(72) Inventors: Seul Ah Lee, Daejeon (KR); Ki Hyun Kim, Daejeon (KR); Gicheul Kim, Daejeon (KR); Wonmun Choi, Daejeon (KR); Won Taeck Lim, Daejeon (KR)

(73) Assignee: LG Chem, Ltd.

( * ) Notice: Subject to any disclaimer, the term of this patent is extended or adjusted under 35 U.S.C. 154(b) by 577 days.

(21) Appl. No.: 16/617,049

(22) PCT Filed: Nov. 20, 2018

(86) PCT No.: PCT/KR2018/014282
§ 371 (c)(1),
(2) Date: Nov. 26, 2019

(87) PCT Pub. No.: WO2019/112204
PCT Pub. Date: Jun. 13, 2019

(65) Prior Publication Data
US 2020/0115508 A1  Apr. 16, 2020

(30) Foreign Application Priority Data

Dec. 8, 2017   (KR) .................. 10-2017-0168683
Jan. 15, 2018  (KR) .................. 10-2018-0005095
Nov. 14, 2018  (KR) .................. 10-2018-0139993

(51) Int. Cl.
| | | |
|---|---|---|
| C08J 3/075 | (2006.01) | |
| C08F 20/04 | (2006.01) | |
| C08J 3/24 | (2006.01) | |
| C08K 5/11 | (2006.01) | |

(52) U.S. Cl.
CPC .............. *C08J 3/075* (2013.01); *C08F 20/04* (2013.01); *C08J 3/245* (2013.01); *C08K 5/11* (2013.01); *C08J 2300/14* (2013.01); *C08J 2333/08* (2013.01)

(58) Field of Classification Search
CPC ........ C08J 3/075; C08J 3/245; C08J 2300/14; C08J 2333/08; C08J 2333/02; C08F 20/04; C08F 220/06; C08F 120/06; C08K 5/11
See application file for complete search history.

(56) References Cited

U.S. PATENT DOCUMENTS

| | | |
|---|---|---|
| 2,877,205 A | 3/1959 | Joginder |
| 5,281,683 A | 1/1994 | Yano et al. |
| 5,840,804 A | 11/1998 | Carl et al. |
| 2003/0065047 A1 | 4/2003 | Katou |
| 2004/0180189 A1 | 9/2004 | Funk et al. |
| 2007/0015860 A1 | 1/2007 | Frank |
| 2008/0075937 A1 | 3/2008 | Wada et al. |
| 2008/0140037 A1* | 6/2008 | Newman .............. C08K 5/103 560/190 |
| 2010/0234531 A1 | 9/2010 | Frank |
| 2013/0172180 A1 | 7/2013 | Naumann et al. |
| 2014/0220279 A1 | 8/2014 | Tsukada et al. |
| 2014/0312273 A1 | 10/2014 | Wattebled et al. |
| 2015/0037526 A1 | 2/2015 | Seth et al. |
| 2015/0217270 A1 | 8/2015 | Ueda et al. |
| 2015/0252130 A1 | 9/2015 | Loick et al. |
| 2016/0184799 A1 | 6/2016 | Lee et al. |
| 2016/0311985 A1 | 10/2016 | Jung et al. |
| 2017/0015798 A1 | 1/2017 | Lee et al. |
| 2017/0260303 A1 | 9/2017 | Chung et al. |
| 2018/0243464 A1 | 8/2018 | Hwang et al. |
| 2019/0085103 A1 | 3/2019 | Kim et al. |
| 2019/0125921 A1 | 5/2019 | Kimura et al. |
| 2020/0115508 A1 | 4/2020 | Lee et al. |

FOREIGN PATENT DOCUMENTS

| | | |
|---|---|---|
| CN | 101094695 A | 12/2007 |
| CN | 103012901 A | 4/2013 |
| CN | 103797062 A | 5/2014 |
| CN | 104024291 A | 9/2014 |
| CN | 105555812 A | 5/2016 |
| CN | 105814088 A | 7/2016 |
| CN | 106164099 A | 11/2016 |
| CN | 107922636 A | 4/2018 |
| EP | 3020737 A1 | 5/2016 |
| EP | 3067370 A1 | 9/2016 |
| FR | 1387099 A | 1/1965 |
| GB | 1054279 A | 1/1967 |
| GB | 2280433 A | 2/1995 |

(Continued)

OTHER PUBLICATIONS

Search Report from Registered Search Organization dated Nov. 25, 2020; 8 pages.
Chinese Search Report for Application No. 201880078028.3 dated May 8, 2021, 2 pages.
Gorodetskaya, et al., Functionalized Hyperbranched Polymers via Olefin Metathesis, Macromolecules, Published on Web Mar. 2009, pp. 2895-2898, vol. 42, American Chemical Society.
International Search Report including Written Opinion for Application No. PCT/KR2018/014282, dated Mar. 8, 2019, pp. 1-8.
Kritskaya, et al., A Model of the Formation of Branched Polymethyl Methacrylates, Chemical Physics of Polymer Materials, Russian Journal of Physical Chemistry B, 2009, pp. 835-843, vol. 3, No. 5.
O'Brien, et al., Facile, versatile and cost effective route to branched vinyl polymers, Polymer, 2000, pp. 6027-6031, vol. 41.

(Continued)

*Primary Examiner* — Andrew J. Oyer
(74) *Attorney, Agent, or Firm* — Lerner, David, Littenberg, Krumholz & Mentlik, LLP

(57) ABSTRACT

The present disclosure relates to a preparation method of a super absorbent polymer containing a novel cross-linking agent compound. The preparation method of a super absorbent polymer of the present disclosure can provide a super absorbent polymer exhibiting excellent absorption properties and an excellent deodorizing effect by including a cross-linking agent with a novel structure. Therefore, according to the present disclosure, since a separate additive for a deodorizing property is not required, processability and economic efficiency of the manufacturing process can be improved.

9 Claims, No Drawings

(56) References Cited

FOREIGN PATENT DOCUMENTS

| | | |
|---|---|---|
| JP | 2002121228 A | 4/2002 |
| JP | 2004123611 A | 4/2004 |
| JP | 2004530777 A | 10/2004 |
| JP | 2006116535 A | 5/2006 |
| JP | 2006528708 A | 12/2006 |
| JP | 2008522003 A | 6/2008 |
| JP | 2016521306 A | 7/2016 |
| JP | 2016537490 A | 12/2016 |
| JP | 2017502108 A | 1/2017 |
| JP | 2017185485 A | 10/2017 |
| JP | 2020516753 A | 6/2020 |
| KR | 950008724 B1 | 8/1995 |
| KR | 20110082518 A | 7/2011 |
| KR | 20140094536 A | 7/2014 |
| KR | 20150104536 A | 9/2015 |
| KR | 20160071250 A | 6/2016 |
| KR | 20160117180 A | 10/2016 |
| KR | 101700907 B1 | 1/2017 |
| KR | 20180043143 A | 4/2018 |
| WO | 2008093507 A1 | 8/2008 |
| WO | 2010040466 A1 | 4/2010 |
| WO | 2014034897 A1 | 3/2014 |
| WO | 2016159600 A1 | 10/2016 |
| WO | 2017170501 A1 | 10/2017 |

OTHER PUBLICATIONS

Odian, Principles of Polymerization, 1981, p. 203, Second Edition, John Wiley & Sons.
Schwalm, UV Coatings Basics Recent Developments and New Applications, Dec. 2006, p. 115, Elsevier Science.
International Search Report from Application No. PCT/KR2018/014281 dated Mar. 8, 2019, 2 pages.
Extended European Search Report including Written Opinion for EP18885147.1 dated Oct. 8, 2020; 7 pages.
Search Report from Chinese Office Action for Application No. 2018800246633 dated Sep. 29, 2020; 2 pages.

* cited by examiner

PREPARATION METHOD OF SUPER ABSORBENT POLYMER

CROSS-REFERENCE TO RELATED APPLICATIONS

The present application is a national phase entry under 35 U.S.C. § 371 of International Application No. PCT/KR2018/014282, filed Nov. 20, 2018, which claims priority from Korean Patent Application No. 10-2017-0168683 filed on Dec. 8, 2017, Korean Patent Application No. 10-2018-0005095 filed on Jan. 15, 2018, and Korean Patent Application No. 10-2018-0139993 filed on Nov. 14, 2018, the disclosures of which are incorporated herein by reference in their entirety.

TECHNICAL FIELD

The present disclosure relates to a preparation method of a super absorbent polymer containing a novel cross-linking agent compound.

BACKGROUND OF ART

A super absorbent polymer (SAP) is a type of synthetic polymeric material capable of absorbing 500 to 1000 times its own weight of moisture. Various manufacturers have called it by different names, such as SAM (Super Absorbency Material), AGM (Absorbent Gel Material), and the like. Such super absorbent polymers started to be practically applied in sanitary products, and they are now being widely used not only for hygiene products such as disposable diapers for children, etc., but also for water retaining soil products for gardening, water stop materials for civil engineering and construction, sheets for raising seedlings, fresh-keeping agents for food distribution fields, materials for poultices, or the like.

In most cases, the super absorbent polymer is widely used in the field of hygiene products such as diapers and sanitary napkins, and for this purpose, it is necessary to exhibit a high absorption capacity for moisture and the like. In addition, it is necessary for the absorbed moisture to not leak even under external pressure. Further, it needs to show excellent permeability while maintaining its shape even in an expanded (swelled) state after absorbing water.

Therefore, in order for the super absorbent polymer to have excellent performance, the base resin, which is the most important constituent polymer, should have high absorption ability.

In order to prepare the base resin, generally, the internal cross-linking density of the polymer can be controlled by polymerizing an acrylic acid-based monomer in the presence of an internal cross-linking agent. The internal cross-linking agent is used for cross-linking the interior of a polymer in which an acrylic acid-based monomer is polymerized, that is, a base resin, and the internal cross-linking density of the base resin can be controlled according to the type and content of the internal cross-linking agent. When the cross-linking density of the base resin is low, the absorption ability is increased but strength is weak, so the shape cannot be maintained in subsequent steps. When the cross-linking density is too high, strength is increased but the water absorption ability may be deteriorated. Therefore, it is very important to appropriately control the cross-linking density in view of the strength and the absorption ability of the base resin.

Further, the super absorbent polymer prepared by polymerizing an acrylic acid-based monomer has a characteristic odor of acrylic acid, and when it is used for hygiene products such as diapers, it is accompanied with an unpleasant odor when urine or the like is excreted. Therefore, effectively reducing these odors is required. For this purpose, a method of using a porous adsorbent material in combination with a super absorbent polymer has been developed.

When the porous adsorbent material is mixed with the super absorbent polymer, the odor can be reduced. However, there a problem in that physical properties of the super absorbent polymer such as absorption ability and permeability are deteriorated, or a caking phenomenon occurs in which the super absorbent polymer aggregates or hardens with time.

DETAILED DESCRIPTION OF THE INVENTION

Technical Problem

The present disclosure has been developed to solve the above problems, and to provide a preparation method of a super absorbent polymer which is excellent in deodorizing property and basic absorption properties without using also an additive such as a porous adsorbent material.

Technical Solution

In order to achieve the above object, the present disclosure provides a preparation method of a super absorbent polymer, including the steps of:

cross-linking an acrylic acid-based monomer having at least partially neutralized acidic groups in the presence of an internal cross-linking agent to form a hydrogel polymer;

drying the hydrogel polymer to form a base resin; and heating the base resin in the presence of a surface cross-linking agent to perform surface modification to the base resin, wherein the internal cross-linking agent contains a compound represented by the following Chemical Formula 1:

[Chemical Formula 1]

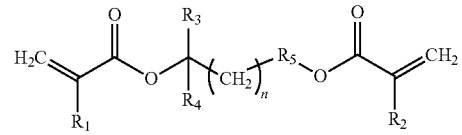

wherein, in Chemical Formula 1, $R_1$ and $R_2$ are each independently hydrogen or methyl, $R_3$ and $R_4$ are each independently hydrogen or a C1 to C20 alkyl, $R_5$ is a linear or branched C1 to C20 alkylene substituted with a linear or branched C2 to C10 alkenyl, or a linear or branched C2 to C20 alkenylene, and n is an integer of 0 to 10.

In Chemical Formula 1, $R_1$ and $R_2$ may be hydrogen.

In Chemical Formula 1, $R_3$ and $R_4$ may each independently be a C1 to C5 alkyl.

In Chemical Formula 1, $R_5$ may be a linear or branched C1 to C10 alkylene substituted with a C1 to C10 alkenyl, or may be a linear or branched C2 to C10 alkenylene.

The compound represented by Chemical Formula 1 may be selected from the compounds represented by the following Chemical Formulae 1-1 to 1-3.

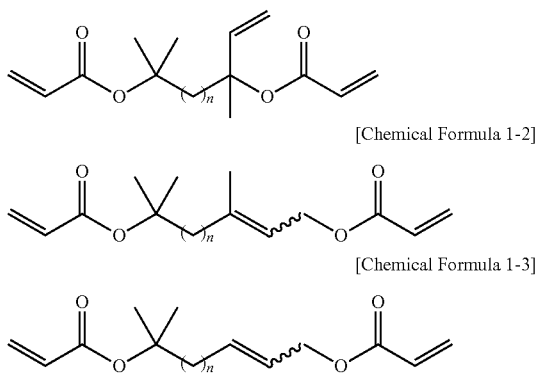

[Chemical Formula 1-1]

[Chemical Formula 1-2]

[Chemical Formula 1-3]

In Chemical Formulae 1-1 to 1-3, n is as defined in Chemical Formula 1.

The compound represented by Chemical Formula 1 may be contained in an amount of 1 to 100 wt % based on a total weight of the internal cross-linking agent.

The internal cross-linking agent may be contained in an amount of 0.01 to 5 parts by weight based on 100 parts by weight of the acrylic acid-based monomer.

The drying of the hydrogel polymer may be carried out at a temperature of 150 to 200° C.

The drying of the hydrogel polymer may be carried out for 10 to 100 minutes.

The base resin may have centrifuge retention capacity (CRC) to a saline solution of 50 to 90 g/g.

Advantageous Effects

The preparation method of a super absorbent polymer of the present disclosure can provide a super absorbent polymer exhibiting excellent absorption properties and an excellent deodorizing effect by including a cross-linking agent with a novel structure. Therefore, according to the present disclosure, since a separate additive for deodorizing is not required, processability and economic efficiency of the manufacturing process can be improved.

DETAILED DESCRIPTION OF THE EMBODIMENTS

As the present invention can be variously modified and have various forms, specific embodiments thereof are shown by way of examples and will be described in detail. However, it is not intended to limit the present invention to the particular form disclosed, and it should be understood that the present invention includes all modifications, equivalents, and replacements within the idea and technical scope of the present invention.

One embodiment of the present disclosure provides a preparation method of a super absorbent polymer, including the steps of:

cross-linking an acrylic acid-based monomer having at least partially neutralized acidic groups in the presence of an internal cross-linking agent to form a hydrogel polymer;

drying the hydrogel polymer to form a base resin; and heating the base resin in the presence of a surface cross-linking agent to perform surface modification to the base resin, wherein the internal cross-linking agent contains a compound represented by the following Chemical Formula 1:

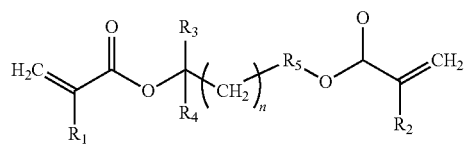

[Chemical Formula 1]

wherein, in Chemical Formula 1, $R_1$ and $R_2$ are each independently hydrogen or methyl, $R_3$ and $R_4$ are each independently hydrogen or a C1 to C20 alkyl, $R_5$ is a linear or branched C1 to C20 alkylene substituted with a linear or branched C2 to C10 alkenyl, or is a linear or branched C2 to C20 alkenylene, and n is an integer of 0 to 10.

For reference, the term "polymer" or "cross-linked polymer" in the present disclosure means that an acrylic acid-based monomer is in a state of being polymerized in the presence of an internal cross-linking agent including the cross-linking agent compound of Chemical Formula 1, and may cover all moisture content ranges or particle diameter ranges. Among the above polymers, a polymer having a moisture content of about 40 wt % or more after polymerization and before drying can be referred to as a hydrogel polymer.

In addition, the term "base resin" or "base resin powder" refers to a polymer in the form of a powder by drying and pulverizing the polymer. It also refers to a polymer before the surface cross-linking step, so that a cross-linking structure is not formed on the surface of the polymer.

The cross-linking agent compound represented by Chemical Formula 1 is a pyrolytic internal cross-linking agent. The internal cross-linking structure of the polymer obtained by cross-linking the compound of Chemical Formula 1 and the acrylic acid-based monomer can be decomposed by heat (for example, at 150° C. or higher). Accordingly, when the acrylic acid-based monomer is cross-linked and polymerized in the presence of an internal cross-linking agent containing the cross-linking agent compound of Chemical Formula 1, a cross-linked polymer in which a pyrolytic internal cross-linking structure is introduced can be provided.

Thereafter, when the cross-linked polymer is introduced in a subsequent step at a high temperature, such as a surface cross-linking step, the cross-linked structure of the cross-linked polymer derived from the compound of Chemical Formula 1 is at least partially decomposed. As a result, the internal cross-linking density of the cross-linked polymer is reduced. On the other hand, the surface of the cross-linked polymer is further cross-linked by a surface cross-linking agent, thereby increasing external cross-linking density. Therefore, when a base resin is prepared by cross-linking an acrylic acid-based monomer in the presence of an internal cross-linking agent represented by Chemical Formula 1, and is subjected to a subsequent step such as surface cross-linking, the internal cross-linking structure in the cross-linked polymer is decomposed and the surface of the cross-linked polymer is further cross-linked to obtain a super absorbent polymer in which the cross-linking density increases from inside to outside of the resin.

The super absorbent polymer thus prepared may have reduced internal cross-linking density compared to the base resin of the conventional super absorbent polymer. Accordingly, the super absorbent polymer can exhibit relatively improved water retention capacity compared with the conventional super absorbent polymer. In addition, the super absorbent polymer may have a thicker surface cross-linked layer than the conventional super absorbent polymer, since the surface cross-linking proceeds after or during decomposition of the internal cross-linking. Thus, the super absorbent polymer can exhibit excellent absorption ability under pressure. Therefore, unlike the conventional common sense that the water retention capacity and the absorption ability under pressure are inversely proportional to each other, the super absorbent polymer of one embodiment increases in cross-linking density from inside to outside and various physical properties such as water retention capacity and absorption ability under pressure are improved together, and thus excellent properties can be exhibited.

Hereinafter, the preparation method of a super absorbent polymer of one embodiment will be described in more detail.

In the step of forming a hydrogel polymer, a monomer composition including an acrylic acid-based monomer having at least partially neutralized acidic groups, an internal cross-linking agent containing the compound of Chemical Formula 1, and a polymerization initiator are cross-linked and polymerized to form a hydrogel polymer.

The acrylic acid-based monomer is a compound represented by the following Chemical Formula 2:

R—COOM  [Chemical Formula 2]

wherein, in Chemical Formula 2,

R is a C2 to C5 alkyl group having an unsaturated bond, and

M is a hydrogen atom, a monovalent or divalent metal, an ammonium group, or an organic amine salt.

Preferably, the acrylic acid-based monomer includes at least one selected from the group consisting of acrylic acid, methacrylic acid, and a monovalent metal salt, a divalent metal salt, an ammonium salt, and an organic amine salt thereof.

Herein, the acrylic acid-based monomers may be those having acidic groups which are at least partially neutralized. A degree of neutralization of the acrylic acid-based monomer may be about 50 to 95 mol %, or about 60 to 85 mol %. Within this range, it is possible to provide a super absorbent polymer having excellent water retention capacity without the possibility of precipitation upon neutralization. An excessively high degree of neutralization causes the neutralized monomers to be precipitated, and thus polymerization may not readily occur, whereas an excessively low degree of neutralization not only deteriorates the absorbency of the polymer, but also endows the polymer with hard-to-handle properties, such as those of an elastic rubber.

In the monomer composition including the acrylic acid-based monomer, the concentration of the acrylic acid-based monomer may be about 20 to 60 wt %, or about 25 to 50 wt %, based on the entire monomer composition including the raw materials, the polymerization initiator, and a solvent, and is properly controlled in consideration of polymerization time and reaction conditions. However, when the concentration of the monomer is excessively low, the yield of the super absorbent polymer may become low and economic efficiency may be reduced. On the contrary, when the concentration of the monomer is excessively high, there is a process problem that part of the monomers is precipitated, or pulverization efficiency is lowered upon pulverization of the polymerized hydrogel polymer, and the physical properties of the super absorbent polymer may be deteriorated.

In the present disclosure, the monomer composition includes an internal cross-linking agent for cross-linking the interior of the polymerized polymer of the acrylic acid-based monomer. The internal cross-linking agent is distinguished from a surface cross-linking agent for cross-linking the surface of the polymer. In the present disclosure, a compound represented by the following Chemical Formula 1 is included as the internal cross-linking agent.

[Chemical Formula 1]

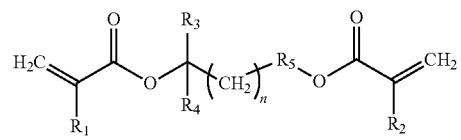

In Chemical Formula 1, $R_1$ and $R_2$ are each independently hydrogen or methyl, $R_3$ and $R_4$ are each independently hydrogen or a C1 to C20 alkyl, $R_5$ is a linear or branched C1 to C20 alkylene substituted with a linear or branched C2 to C10 alkenyl, or is a linear or branched C2 to C20 alkenylene, and n is an integer of 0 to 10.

In the present disclosure, "alkyl" refers to a linear or branched saturated monovalent hydrocarbon having 1 to 20, preferably 1 to 10, and more preferably 1 to 5 carbon atoms. Specific examples of the alkyl include methyl, ethyl, propyl, n-propyl, isopropyl, n-butyl, isobutyl, tert-butyl, sec-butyl, 1-methyl-butyl, 1-ethyl-butyl, n-pentyl, isopentyl, neopentyl, tert-pentyl, n-hexyl, isohexyl, 1-methylpentyl, 2-methylpentyl, 4-methyl-2-pentyl, 3,3-dimethylbutyl, 2-ethylbutyl, n-heptyl, 1-methylhexyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, 2-methylpentyl, 4-methylhexyl, 5-methylhexyl, and the like, but are not limited thereto.

In the present disclosure, "alkylene" refers to a linear or branched saturated divalent hydrocarbon having 1 to 20, preferably 1 to 10, and more preferably 1 to 5 carbon atoms. Specific examples of the alkylene include methylene, ethylene, propylene, butylene, hexylene, heptylene, octylene, and the like, but are not limited thereto.

In the present disclosure, "alkenyl" refers to a linear or branched monovalent hydrocarbon containing at least one carbon-carbon double bond having 2 to 20, preferably 2 to 10, and more preferably 2 to 6 carbon atoms. The alkenyl may be bonded through a carbon atom containing a carbon-carbon double bond and/or through a saturated carbon atom. Specific examples of the alkenyl include allyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, and the like, but are not limited thereto.

In the present disclosure, "alkenylene" refers to a linear or branched divalent hydrocarbon containing at least one carbon-carbon double bond having 2 to 20, preferably 2 to 10, and more preferably 2 to 6 carbon atoms. The alkenylene may be bonded through a carbon atom containing a carbon-carbon double bond and/or through a saturated carbon atom.

Specific examples of the alkenylene include ethenylene, propenylene, butenylene, and the like, but are not limited thereto.

The cross-linking agent compound of Chemical Formula 1 is a di(meth) acrylate derivative compound having a novel structure.

According to one embodiment of the present disclosure, $R_1$ and $R_2$ may be hydrogen.

According to one embodiment of the present disclosure, $R_3$ and $R_4$ may each independently be a C1 to C5 alkyl. Preferably, $R_3$ and $R_4$ may be methyl.

According to one embodiment of the present disclosure, $R_5$ may be a linear or branched C1 to C10 alkylene substituted with a C1 to C10 alkenyl, or a linear or branched C2 to 10 alkenylene. For example, $R_5$ may be 3-methyl-2-hexylene, 3-methyl-11-hexylene, 4,8-dimethylundeca-3,7-dienylene, and the like, but the present disclosure is not limited thereto.

According to one embodiment of the present disclosure, n may be an integer of 0 to 10. Preferably, n may be 0 to 5, or 0 to 3.

According to one embodiment of the present disclosure, the compound represented by Chemical Formula 1 may be selected from the compounds represented by the following Chemical Formulae 1-1 to 1-3:

[Chemical Formula 1-1]

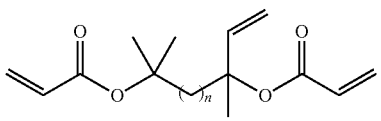

[Chemical Formula 1-2]

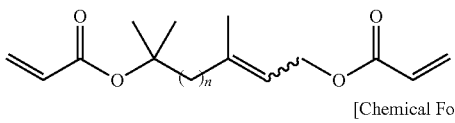

[Chemical Formula 1-3]

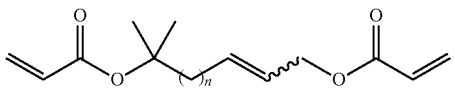

The use of the compound represented by Chemical Formula 1 is not limited thereto, but the compound may be used as a cross-linking agent in the polymerization with an acrylic acid-based monomer. Specifically, the compound represented by Chemical Formula 1 may serve as a cross-linking agent in the polymerization of the acrylic acid-based monomer. When the compound is exposed to a high temperature during processing of the base resin, it can release a unique aroma and have a deodorizing effect.

Meanwhile, the cross-linking agent compound of Chemical Formula 1 may be prepared by a known organic synthesis method, for example, by the following Reaction Scheme 1, but the present disclosure is not limited thereto.

[Reaction Scheme 1]

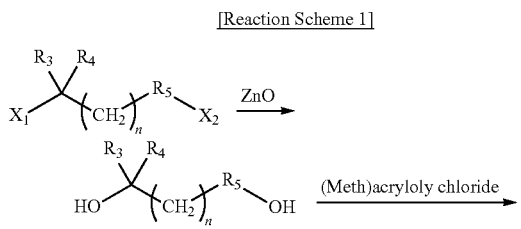

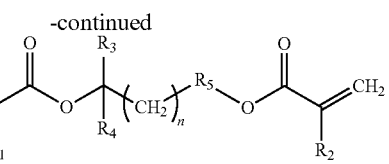

In Reaction Scheme 1, $R_1$ to $R_5$, and n are as defined in Chemical Formula 1, and $X_1$ and $X_2$ are each independently a halogen.

According to one embodiment of the present disclosure, the compound of Chemical Formula 1 can be prepared by the following method, when it is the compound of Chemical Formula 1-1 or 1-2. But the present disclosure is not limited thereto.

First, a halogen group is introduced into a starting material of myrcene or geraniol. Next, a diol is prepared by substituting a halogen group with a hydroxy group. Then, an acryloyl group is introduced into the diol to obtain a mixture of the above Formulae 1-1 and 1-2, and these are separated.

The myrcene and geraniol are derivative compounds of a terpene. Terpenes are flammable, unsaturated hydrocarbons that are widely distributed in plants and animals, and are hydrocarbons having a general formula of $(C_5H_8)_k$ ($k \geq 2$). Terpenes are classified according to the number of isoprene ($C_5H_8$) units in the molecule, and monoterpene ($C_{10}H_{16}$), sesquiterpene ($C_{15}H_{24}$) and diterpene ($C_{20}H_{32}$) have two, three, and four isoprene units, respectively. Monoterpenes, sesquiterpenes, and diterpenes are found in essential oils of plants, and are used as raw materials for fragrances, medicines, and in the chemical industry. Also, terpenes, terpene alcohols, terpene aldehydes, terpene ketones, terpene oxides, terpene lactones, and the like are collectively referred to as terpenoids.

Myrcene is a kind of monoterpene found in abundance in essential oils in many plants, including hops, lemon grass, thyme, verbena, and bay leaves, and has a unique herbal scent.

Geraniol is a kind of monoterpenoid, and also included in many essential oils such as geranium and lemon. It is not soluble in water, but is easily soluble in most common organic solvents and has an aroma like a rose.

When the compound of Chemical Formula 1 is prepared by using a natural terpene such as myrcene or geraniol as a starting material, and this is used for cross-linking the polymer as a cross-linking agent, a deodorizing effect can be ensured and a scent can be released without any additional additive, since the myrcene or geraniol gives off the original scent when the cross-linking agent is decomposed at a high temperature.

More specifically, according to one embodiment of the present disclosure, the cross-linking agent compounds of Chemical Formulae 1-1 and 1-2 may be prepared by the following Reaction Schemes 2-1 and 3.

[Reaction Scheme 2-1]

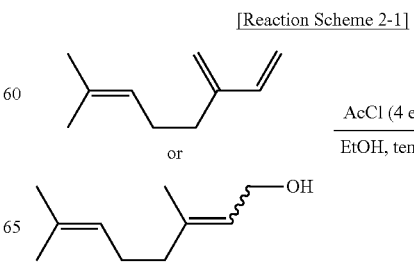

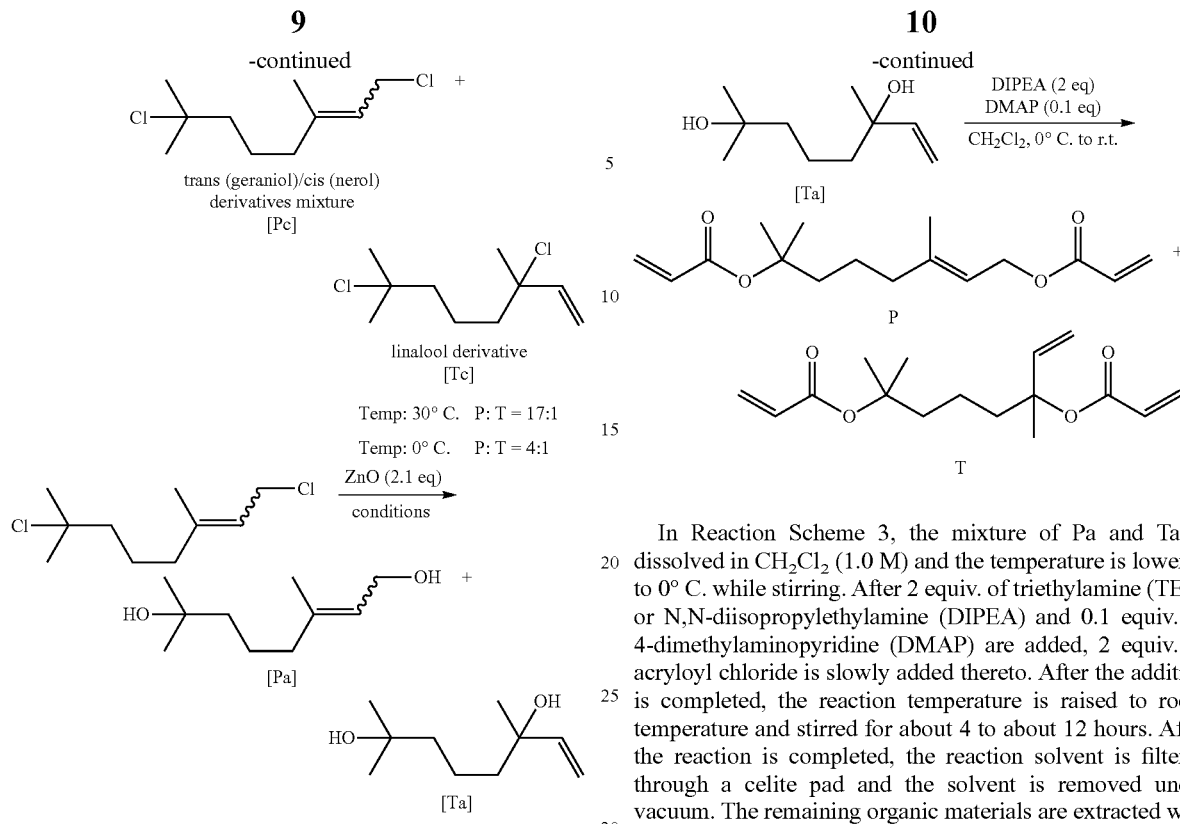

In Reaction Scheme 2-1, 1 equiv. of myrcene or geraniol is dissolved in ethanol and stirred. Acetic chloride (4 equiv.) is slowly added dropwise while maintaining a reaction temperature at 0 to 30° C. When the conversion and termination of the reaction to dichloronate compounds are confirmed by TLC, the solvent and the unreacted materials are removed by evaporation under reduced pressure. The resulting dichloronate compounds (a mixture of Pc and Tc) are used in the next reaction without any further purification. The obtained dichloronate mixture is put into an acetone aqueous solution of about 80% purity, about 2.1 equiv. of zinc oxide (ZnO) is added, and the mixture is refluxed at a temperature of 100° C.

When the conversion and termination of the reaction to the diol compounds are confirmed by TLC, the mixture is cooled to room temperature. Thereafter, a solid precipitate is removed using a filtration filter, and the remaining acetone is removed by evaporation under reduced pressure. The remaining organic material and a small amount of water are removed by fractional distillation to obtain desired diol compounds (a mixture of Pa and Ta). When the diol compounds are prepared according to Reaction Scheme 2-1, it can be confirmed that the amount of the compound Ta is increased compared to that of the compound Pa.

Subsequently, an acryloyl group can be introduced into the above mixture of Pa and Ta by the following Reaction Scheme 3.

In Reaction Scheme 3, the mixture of Pa and Ta is dissolved in $CH_2Cl_2$ (1.0 M) and the temperature is lowered to 0° C. while stirring. After 2 equiv. of triethylamine (TEA) or N,N-diisopropylethylamine (DIPEA) and 0.1 equiv. of 4-dimethylaminopyridine (DMAP) are added, 2 equiv. of acryloyl chloride is slowly added thereto. After the addition is completed, the reaction temperature is raised to room temperature and stirred for about 4 to about 12 hours. After the reaction is completed, the reaction solvent is filtered through a celite pad and the solvent is removed under vacuum. The remaining organic materials are extracted with water and ethyl acetate, and the remaining water in the organic layer is removed using sodium sulfate ($Na_2SO_4$). The solids are filtered off and the remaining organic solvent is removed under vacuum to obtain desired P (the compound of Chemical Formula 1-2) and T (the compound of Chemical Formula 1-1).

The compounds of Chemical Formulae 1-1 and 1-2 obtained above may be used after separation and purification, or may be used in the form of a mixture without separation.

According to another embodiment of the present disclosure, the cross-linking agent compounds of Chemical Formulae 1-1 and 1-2 may be prepared by the following Reaction Schemes 2-2 and 3.

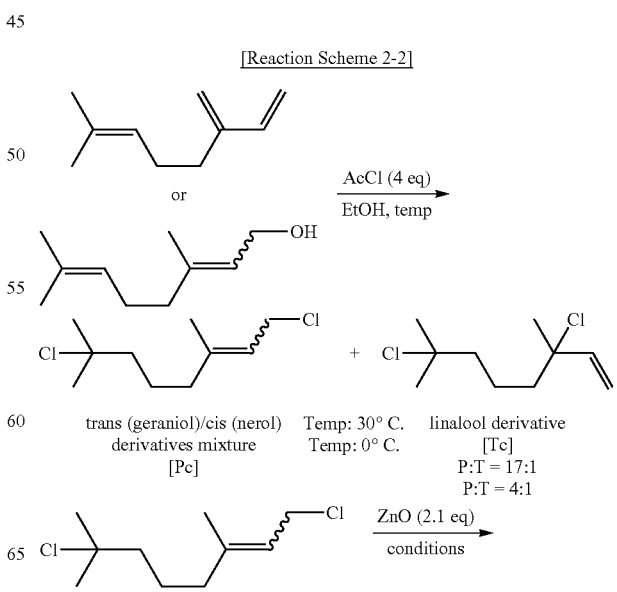

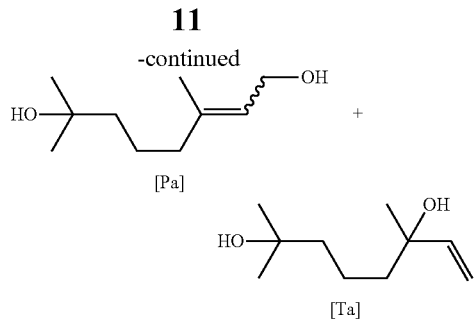

In Reaction Scheme 2-2, the reaction up to the dichloronate compounds is performed in the same manner as in Reaction Scheme 1. Thereafter, in the reaction replacing Cl with OH, the obtained dichloronate mixture is placed in acetic acid, about 2.1 equiv. of zinc oxide (ZnO) is added thereto, and the mixture is stirred at room temperature.

After confirming the conversion of the reaction and termination by TLC, the solid precipitate is removed using a filter, and the remaining acetic acid is removed by evaporation under reduced pressure. Methanol is added to the remaining organic materials, about 2 equiv. of potassium carbonate ($K_2CO_3$) is added thereto, and the mixture is refluxed and stirred. When the conversion and termination of the reaction are confirmed by TLC, the reaction temperature is cooled to room temperature. After methanol is removed by evaporation under reduced pressure, the remaining organic materials are distilled under reduced pressure to obtain diol compounds (a mixture of Pa and Ta). On the other hand, according to Reaction Scheme 2-2, it can be confirmed that the amount of Compound Pa is increased compared to that of Compound Ta, so that only Compound Pa is substantially detected (a molar ratio of Compound Pa: Compound Ta is 25:1 or more).

Subsequently, an acryloyl group can be introduced into the above mixture of Pa and Ta by the Reaction Scheme 3.

Similarly, the compounds of Chemical Formulae 1-1 and 1-2 obtained above may be used after separation and purification, or may be used in the form of a mixture without separation.

In addition, in the preparation method of the present disclosure, the internal cross-linking agent may further include a conventionally known internal cross-linking agent in addition to the cross-linking compound of the above Chemical Formula 1.

As the conventional internal cross-linking agent, a compound containing two or more cross-linkable functional groups in the molecule can be used. Specific examples thereof include at least one selected from the group consisting of N,N'-methylenebisacrylamide, trimethylolpropane tri(meth)acrylate, ethylene glycol di(meth)acrylate, polyethylene glycol (meth)acrylate, propylene glycol di(meth)acrylate, polypropylene glycol (meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentaacrylate, glycerin tri(meth)acrylate, pentaerythritol tetraacrylate, triarylamine, ethylene glycol diglycidyl ether, propylene glycol, glycerin, and ethylene carbonate, but the present disclosure is not limited thereto.

Meanwhile, in order to ensure the water retention capacity and deodorizing effect of the super absorbent polymer, the compound represented by Chemical Formula 1 may be contained in an amount of 1 to 100 wt % or 50 to 100 wt % based on a total weight of the internal cross-linking agent.

In addition, the internal cross-linking agent may be contained in an amount of 0.01 to 5 parts by weight, 0.01 to 3 parts by weight, 0.1 to 3 parts by weight, or 0.2 to 1.5 parts by weight based on 100 parts by weight of the acrylic acid-based monomer. Herein, the amount of the acrylic acid-based monomer is based on the weight of the acrylic acid-based monomer before the acidic groups of the monomer having acidic groups is neutralized. For example, when the acrylic acid-based monomer contains acrylic acid, the amount of the internal cross-linking agent can be adjusted based on the weight of the monomer before neutralizing the acrylic acid.

In addition, the internal cross-linking agent may be used at an appropriate concentration for the monomer mixture.

The internal cross-linking agent is used within the above-mentioned range to provide a super absorbent polymer having an appropriate cross-linking density gradient and exhibiting simultaneously improved water retention capacity and absorption ability under pressure.

In the preparation method of a super absorbent polymer of one embodiment, a polymerization initiator that has been generally used for preparing a super absorbent polymer can be applied without particular limitation.

Specifically, the polymerization initiator may be an initiator for thermal polymerization or an initiator for photopolymerization by UV radiation according to the polymerization method. However, even when the photopolymerization method is applied thereto, a certain amount of heat is generated by UV radiation and the like, and some heat occurs as the polymerization reaction, an exothermal reaction, progresses. Therefore, the composition may additionally include the thermal polymerization initiator.

Any compound which can form a radical by light such as UV rays may be used as the photopolymerization initiator without limitation.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and α-aminoketone. Further, as a specific example of acyl phosphine, commercial Lucirin TPO, namely, 2,4,6-trimethyl-benzoyl-trimethyl phosphine oxide, may be used. More various photopolymerization initiators are well disclosed in "UV Coatings: Basics, Recent Developments and New Application (Elsevier, 2007)" written by Reinhold Schwalm, p 115, and the present invention is not limited thereto.

The concentration of the photopolymerization initiator in the monomer composition may be about 0.01 to about 1.0 wt %. When the concentration of the photopolymerization initiator is excessively low, the polymerization rate becomes slow, and when the concentration of the photopolymerization initiator is excessively high, the molecular weight of the super absorbent polymer becomes low and the properties may be uneven.

Furthermore, as the thermal polymerization initiator, one or more initiators selected from the group consisting of a persulfate-based initiator, an azo-based initiator, hydrogen peroxide, and ascorbic acid may be used. Specifically, sodium persulfate ($Na_2S_2O_8$), potassium persulfate ($K_2S_2O_8$), ammonium persulfate (($NH_4$)$_2S_2O_8$), and the like may be used as examples of the persulfate-based initiators; and 2,2-azobis-(2-amidinopropane)dihydrochloride, 2,2-azobis-(N,N-dimethylene)isobutyramidine dihydrochloride, 2-(carbamoylazo)isobutyronitrile, 2,2-azobis-[2-(2-imidazolin-2-yl)propane]dihydrochloride, 4,4-azobis-(4-cyanovaleric acid), and the like may be used as examples of azo-based initiators. More various thermal polymerization initiators are well disclosed in "Principle of Polymerization (Wiley, 1981)" written by Odian, p 203, and the present invention is not limited thereto.

The concentration of the thermal polymerization initiator included in the monomer composition may be about 0.001 to about 2.0 wt %. When the concentration of the thermal polymerization initiator is excessively low, additional thermal polymerization hardly occurs and there may be less effect according to the addition of the thermal polymerization initiator, and when the concentration of the thermal polymerization initiator is excessively high, the molecular weight of the super absorbent polymer becomes low and the properties may be uneven.

The monomer composition may further include an additive such as a thickener, a plasticizer, a preservation stabilizer, an antioxidant, and the like, if necessary.

The raw materials such as the water-soluble ethylene-based unsaturated monomer, the internal cross-linking agent, the inorganic substance, the polymerization initiator, and the additive may be prepared in the form of a solution dissolved in a solvent.

At this time, any solvent which can dissolve the components may be used without limitation, and for example, one or more solvents selected from water, ethanol, ethylene glycol, diethylene glycol, triethylene glycol, 1,4-butanediol, propylene glycol, ethylene glycol monobutylether, propylene glycol monomethyl ether, propylene glycol monomethyl ether acetate, methylethylketone, acetone, methyl amyl ketone, cyclohexanone, cyclopentanone, diethylene glycol monomethyl ether, diethylene glycol ethyl ether, toluene, xylene, butyrolactone, carbitol, methyl cellosolve acetate, and N,N-dimethylacetamide may be used solely or in combination.

The solvent may be included in the monomer composition at a residual quantity excluding the above components.

The method of preparing the hydrogel polymer by thermal polymerization or photopolymerization of the monomer composition is not particularly limited as long as it is a common polymerization method.

Specifically, the polymerization method is largely divided into thermal polymerization and photopolymerization according to the energy source of the polymerization. In the case of thermal polymerization, it is generally carried out in a reactor having a kneading spindle, such as a kneader. Further, the thermal polymerization can proceed at a temperature of about 80° C. or more and less than about 110° C. so as to not decompose the internal cross-linking agent by heat. The means for controlling the polymerization temperature in the above-mentioned range is not particularly limited. It is possible to provide a thermal media to the reactor or provide a heat source directly to the reactor. At this time, usable thermal media may be a heated fluid such as steam, hot air, hot oil, and the like, but the present invention is not limited thereto. Furthermore, the temperature of the thermal media provided thereto may be properly selected in consideration of the means of the thermal media, heating speed, and target temperature of heating. Meanwhile, an electric heater or a gas heater may be directly used as the provided heat source, but the present invention is not limited thereto.

On the other hand, in the case of photopolymerization, it may be carried out in a reactor equipped with a movable conveyor belt. However, the polymerization method is just an example, and the present invention is not limited thereto.

For example, as described above, when the thermal polymerization is carried out by providing the thermal media to a reactor equipped with a kneading spindle such as a kneader or heating the reactor, a hydrogel polymer can be obtained from the outlet of the reactor. The obtained hydrogel polymer may have a size of centimeters or millimeters, according to the shape of the kneading spindle installed in the reactor. Specifically, the size of the obtained hydrogel polymer may vary according to the concentration and the feeding speed of the monomer composition.

Furthermore, in the case of carrying out the photopolymerization in a reactor equipped with a movable conveyor belt, the hydrogel polymer may be obtained in the form of a sheet having a width corresponding to a width of the belt. At this time, the thickness of the polymer sheet may vary according to the concentration and the feeding speed of the monomer composition, but it is preferable to feed the monomer composition so that a polymer sheet having a thickness of about 0.5 to about 10 cm can be obtained. It is undesirable to feed the monomer composition so that the thickness of the polymer sheet becomes excessively thin, because it makes the production efficiency low, and when the thickness of the obtained polymer sheet is over 10 cm, the polymerization reaction cannot occur evenly across the thickness because of its excessive thickness.

The polymerization time of the monomer composition is not particularly limited, and may be adjusted to about 30 seconds to 60 minutes.

Generally, the moisture content of the hydrogel polymer obtained by the above method may be about 40 to about 80 wt %. At this time, "moisture content" in the present disclosure is the content of moisture in the entire weight of the hydrogel polymer, and it means a value of which the weight of the dried polymer is subtracted from the weight of the hydrogel polymer. Specifically, the moisture content is defined as a value calculated from the weight loss due to moisture evaporation from the polymer in the process of increasing the temperature of the polymer and drying the same through infrared heating. At this time, the drying condition for measuring the moisture content is that the temperature is increased to about 180° C. and maintained at 180° C., and the total drying time is 20 min including 5 min of a heating step.

Subsequently, a step of drying the obtained hydrogel polymer is carried out.

Herein, a coarse pulverizing step may be further performed before the drying step for increasing the drying efficiency, if necessary.

The pulverizing machine used is not particularly limited. Specifically, it may be at least one selected from the group consisting of a vertical pulverizer, a turbo cutter, a turbo grinder, a rotary cutter mill, a cutter mill, a disc mill, a shred crusher, a crusher, a chopper, and a disc cutter, but it is not limited thereto.

In the pulverizing step, the hydrogel polymer may be crushed to have a diameter of about 2 to about 10 mm.

It is technically difficult to pulverize the hydrogel polymer to have a diameter of less than 2 mm because of its high moisture content, and there may be a phenomenon that the crushed particles cohere with each other. Meanwhile, when the polymer is crushed to have a diameter of larger than 10 mm, the efficiency enhancing effect in the subsequent drying step may be low.

The hydrogel polymer pulverized as above or the hydrogel polymer immediately after the polymerization without the pulverizing step is subjected to drying. At this time, the drying temperature of the drying step may be about 150 to about 250° C. When the drying temperature is lower than about 150° C., the drying time may become excessively long and the properties of the super absorbent polymer finally prepared may decrease. Further, when the drying temperature is higher than about 250° C., the surface of the polymer is excessively dried, and fine powders may be generated in the subsequent pulverization process and the properties of the super absorbent polymer finally prepared may decrease. Therefore, the drying process may be preferably carried out at a temperature of about 150 to about 200° C., more preferably at a temperature of about 160 to about 180° C.

Furthermore, the drying time may be about 10 to about 90 minutes in consideration of process efficiency, but it is not limited thereto.

The drying method in the drying step is not particularly limited as long as it has been generally used in the drying process of the hydrogel polymer. Specifically, the drying step may be carried out by the method of hot air provision, infrared radiation, microwave radiation, UV ray radiation, and the like. The moisture content of the polymer after the drying step may be about 0.1 to about 10 wt %. Subsequently, a step of pulverizing the dried polymer obtained from the drying step is carried out.

The polymer powder obtained after the pulverization step may have a diameter of about 150 to about 850 μm. In order to pulverize the polymer into such diameter, a pin mill, a hammer mill, a screw mill, a roll mill, a disc mill, or a jog mill may be used as the pulverizer, but it is not limited thereto.

Further, in order to control the properties of the super absorbent polymer powder which is finally commercialized after the pulverization step, a separate process of classifying the polymer powders obtained after the pulverization according to the particle size may be carried out. The polymer powders may be classified to have a constant weight ratio according to the particle size.

The base resin thus prepared may have centrifuge retention capacity (CRC) to a saline solution of about 50 to 90 g/g, or about 60 to 85 g/g. The centrifuge retention capacity (CRC) to a saline solution can be measured according to EDANA method NWSP 241.0.R2.

After obtaining the base resin in the powder form through the above-described classification step, the base resin is heated in the presence of a surface cross-linking agent to carry out surface modification.

In the general preparation method of a super absorbent polymer, a surface cross-linking solution containing a surface cross-linking agent is mixed with a dried, pulverized, and classified polymer, that is, a base resin, and then the mixture is heated to carry out a surface cross-linking reaction of the pulverized polymer.

The surface cross-linking step is a step of inducing a cross-linking reaction on the surface of the pulverized polymer in the presence of a surface cross-linking agent to form a super absorbent polymer having improved physical properties. Through the surface cross-linking, a surface cross-linked layer (surface modified layer) is formed on the surface of the pulverized and classified polymer particles.

Generally, surface cross-linking agents are applied on the surface of the base resin particles, so that surface cross-linking reactions occur on the surface of the base resin particles, which improves cross-linkability on the surface of the particles without substantially affecting the interior of the particles. Therefore, the surface cross-linked super absorbent polymer particles have a higher degree of cross-linking near the surface than in the interior, as the cross-linked polymer on the surface of the base resin is further cross-linked.

Meanwhile, the surface cross-linking agent is a compound capable of reacting with functional groups of the base resin. For example, polyalcohol-based compounds, polyepoxy-based compounds, polyamine compounds, haloepoxy compounds, condensates of haloepoxy compounds, oxazoline-based compounds, or alkylene carbonate compounds may be used without particular limitations.

Specific examples of the polyalcohol-based compound may include one or more selected from the group consisting of di-, tri-, tetra-, or polyethylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexane dimethanol.

Further, the polyepoxy-based compound may include ethylene glycol diglycidyl ether, glycidol, and the like. The polyamine compound may include one or more selected from the group consisting of ethylene diamine, diethylene triamine, triethylene tetraamine, tetraethylene pentamine, pentaethylene hexamine, polyethylene imine, and polyamide polyamine.

Further, the haloepoxy compound may include epichlorohydrin, epibromohydrin, or α-methylephichlorohydrin. Meanwhile, the mono-, di-, or polyoxazolidinone compound may include, for example, 2-oxazolidinone and the like.

Further, the alkylene carbonate-based compound may include ethylene carbonate, and the like. These may be used alone or in combination with each other.

The amount of the surface cross-linking agent added may be appropriately selected depending on the kind of the surface cross-linking agent added or the reaction conditions. However, the surface cross-linking agent may be generally used in an amount of about 0.001 to about 5 parts by weight, preferably about 0.01 to about 3 parts by weight, and more preferably about 0.05 to about 2 parts by weight, based on 100 parts by weight of the base resin.

When the amount of the surface cross-linking agent is excessively small, the surface cross-linking reaction hardly occurs, and when the amount is higher than 5 parts by weight based on 100 parts by weight of the polymer, the absorbency such as water retention capacity may be deteriorated due to excessive surface cross-linking reaction.

In addition, the method of adding the surface cross-linking agent to the base resin powder is not particularly limited. For example, a method of adding and mixing the surface cross-linking agent and the base resin powder in a reactor, a method of spraying the surface cross-linking agent on the base resin powder, and a method of mixing the base resin powder and the surface cross-linking agent while continuously providing them to a continuously operating mixer may be used.

When the surface cross-linking agent is added, water may be further mixed together and added in the form of a surface cross-linking solution. When water is added, there is an advantage that the surface cross-linking agent can be uniformly dispersed in the polymer. Herein, the added amount of water is preferably 1 to 10 parts by weight based on 100 parts by weight of the polymer in order to optimize a surface penetration depth of the surface cross-linking agent, while inducing even dispersion of the surface cross-linking agent and preventing the polymer powder from aggregating.

Meanwhile, the surface modification step is performed to the base resin by heating the mixture of the base resin and the surface cross-linking solution.

The surface modification step may be carried out under well-known conditions depending on the kind of the surface cross-linking agent, for example, at a temperature of 100 to 200° C. for 20 to 60 minutes. In a more specific example, when the surface cross-linking agent is a polyvalent epoxy compound, it may be carried out by heating at 120 to 180° C., or 120 to 150° C., for 10 to 50 minutes, or 20 to 40 minutes. When the temperature of the surface modification step is less than 100° C. or the reaction time is too short, the surface cross-linking reaction may not occur properly and transmittancy may be lowered. When the temperature exceeds 200° C. or the reaction time is too long, water retention ability may be lowered.

The heating means for the surface cross-linking reaction is not particularly limited. It is possible to provide a thermal media thereto or provide a heat source directly thereto. At this time, usable thermal media may be a heated fluid such as steam, hot air, hot oil, and the like, but the present invention is not limited thereto. Furthermore, the temperature of the thermal media provided thereto may be properly selected in consideration of the means of the thermal media, heating speed, and target temperature of heating. In addition, an electric heater or a gas heater may be used as the directly provided heat source, but the present invention is not limited thereto.

As described above, the super absorbent polymer prepared according to the present disclosure has a structure in which a part of the thermally decomposable internal cross-linking structure is partially decomposed in the subsequent process at a high temperature after the polymerization due to the characteristics of the novel cross-linking agent compound of Chemical Formula 1, so that the cross-linking density increases from the inside to the outside of the resin. Therefore, the super absorbent polymer may have excellent properties in which various physical properties such as water retention capacity and absorption ability under pressure are improved together. Further, due to the unique aroma from the structural characteristic of the cross-linking agent compound, it is possible to provide a deodorizing effect that reduces the odor peculiar to the super absorbent polymer and/or odors generated when used as hygiene products, and an excellent feeling of use without any additional additive.

Thus, the super absorbent polymer can provide hygiene products such as diapers exhibiting excellent absorption properties and odor characteristics even though it is subjected to a high temperature manufacturing process.

Specifically, the super absorbent polymer thus prepared may have centrifuge retention capacity (CRC) to a saline solution of about 40 to 90 g/g, or about 45 to 85 g/g. The centrifuge retention capacity (CRC) to a saline solution can be measured according to EDANA method NWSP 241.0.R2.

Hereinafter, the function and effect of the present invention will be described in more detail through specific examples of the present invention. However, these examples are for illustrative purposes only, and the invention is not intended to be limited by these examples.

EXAMPLES

Synthesis Examples of Cross-Linking Agent Compound

Synthesis Example 1

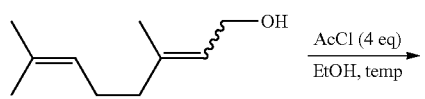

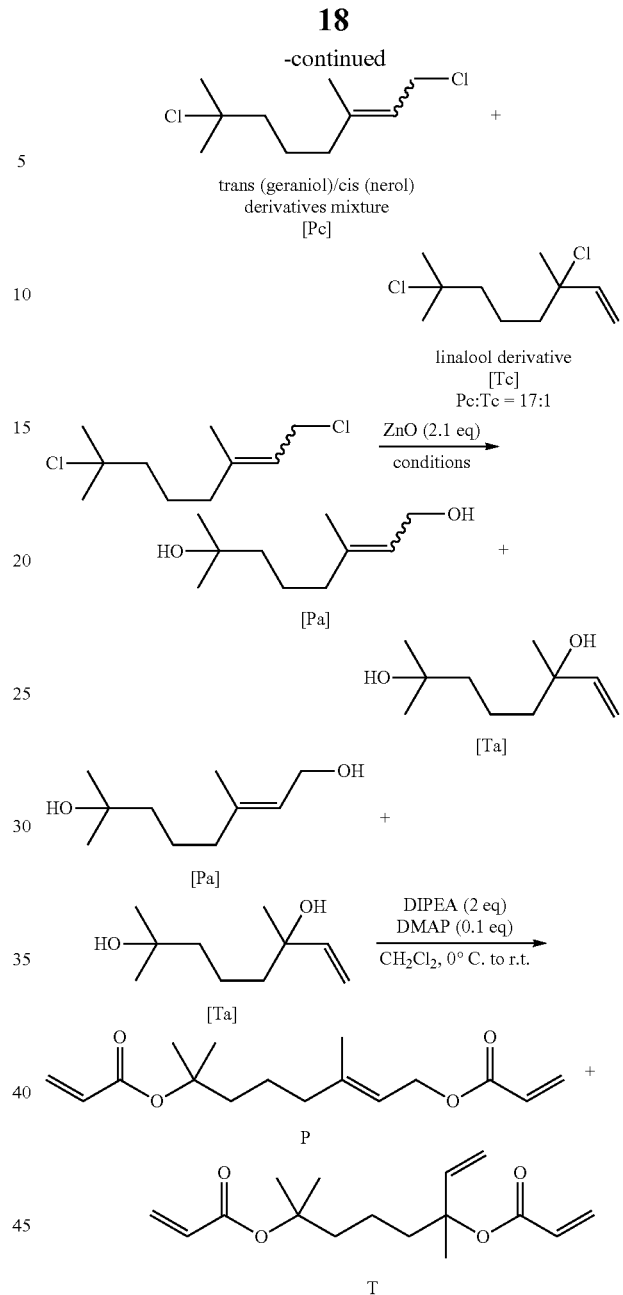

Synthesis Example 1-1

408.7 g of geraniol was dissolved in 700 ml of ethanol and stirred. Acetic chloride (942 g, 856.4 ml, 4 equiv.) was slowly added dropwise while maintaining the reaction temperature at 30° C. When the conversion and termination of the reaction were confirmed by TLC, the solvent and the unreacted materials were removed by evaporation under reduced pressure. The obtained dichloronate compounds (a mixture of Pc and Tc) were used in the next reaction without any further purification.

Pc (CDCl$_3$, 500 MHz): 5.50-5.45 (m, 1H), 4.13-4.07 (m, 2H), 2.16-2.06 (m, 2H), 1.83-1.53 (m, 13H)

Tc (CDCl$_3$, 500 MHz): 6.00 (dd, J=16.87, 11.00, 1H) 5.27 (d, J=16.87, 1H), 5.12 (d, J=11.00, 1H), 2.16-2.06 (m, 2H), 1.83-1.53 (m, 13H).

Synthesis Example 1-2

The dichloronate compounds (a mixture of Pc and Tc, 522.9 g, reference material) obtained in Synthesis Example 1-1 were put into an acetone aqueous solution (1.5 L) of about 80% purity, ZnO (427.2 g, 2.1 equiv.) was added, and the mixture was refluxed at a temperature of 100° C. When the conversion and termination of the reaction were confirmed by TLC, the temperature was cooled to room temperature. Thereafter, the solid precipitate was removed using a filtration filter, and the remaining acetone was removed by evaporation under reduced pressure. The remaining organic material and a small amount of water were removed by fractional distillation to obtain desired diol compounds (a mixture of Pa and Ta).

Pa (CDCl$_3$, 500 MHz): 5.43-5.41 (m, 1H), 4.17-4.12 (m, 2H), 2.12-1.97 (m, 2H), 1.75-1.13 (m, 13H)

Ta (CDCl$_3$, 500 MHz): 5.91 (dd, J=17.10, 10.52, 1H) 5.22 (d, J=17.09, 1H), 5.07 (d, J=10.52, 1H), 2.06-1.97 (m, 2H), 1.76-1.13 (m, 13H).

Synthesis Example 1-3

The diol compounds (51.7 g, reference material) obtained in Synthesis Example 1-2 were dissolved in CH$_2$Cl$_2$ (300 ml), and the temperature was lowered to 0° C. while stirring. After triethylamine (91.1 g, 125.4 ml, 3 equiv.) and 4-dimethylaminopyridine (7.3 g, 0.1 equiv.) were added, acryloyl chloride (57.0 g, 51.0 ml, 2.1 equiv.) was slowly added thereto. After the addition was completed, the reaction temperature was raised to room temperature and stirred for about 6 hours. After the reaction was completed, the reaction solvent was filtered through a celite pad and the solvent was removed under vacuum. The remaining organic materials were extracted with water and ethyl acetate (EA), and the remaining water in the organic layer was removed using sodium sulfate (Na$_2$SO$_4$). The solids were filtered off and the remaining organic solvent was removed under vacuum to obtain a mixture of 2,6-dimethyloct-7-ene-2,6-diyl diacrylate (Compound T) and 3,7-dimethyloct-2-ene-1,7-diyl diacrylate (Compound P) at a yield of about 61%.

2,6-dimethyloct-7-ene-2,6-diyl diacrylate (CDCl$_3$, 500 MHz): 6.15-5.96 (m, 5H), 5.82-5.71 (m, 2H), 5.18-5.12 (m, 2H), 2.15-2.03 (m, 2H), 1.91-1.17 (m, 13H).

3,7-dimethyloct-2-ene-1,7-diyl diacrylate (CDCl$_3$, 500 MHz): 6.39-6.02 (m, 2H), 6.01-5.80 (m, 2H), 5.75-5.72 (m, 2H), 5.44-5.37 (m, 2H), 4.69-4.65 (m, 2H), 2.15-2.03 (m, 2H), 1.77-1.23 (m, 13H).

Synthesis Example 2

Synthesis Example 2-1

The dichloronate compounds (a mixture of Pc and Tc, 313.7 g, reference material) obtained in Synthesis Example 1-1 were put into acetic acid (2 L), ZnO (256.3 g, 2.1 equiv.) was added, and the mixture was stirred at room temperature. When the conversion and termination of the reaction were confirmed by TLC, the solid precipitate was removed using a filtration filter, and the remaining acetic acid was removed by evaporation under reduced pressure. Methanol (1 L) was added to the remaining organic materials, K$_2$CO$_3$ (470.0 g, 2 equiv.) was added thereto, and the mixture was refluxed and stirred. When the conversion and termination of the reaction were confirmed by TLC, the reaction temperature was cooled to room temperature. After methanol was removed by evaporation under reduced pressure, the remaining organic materials were distilled under reduced pressure to obtain diol compounds (a molar ratio of Compound Pa: Compound Ta was 25:1 or more, so that only Compound Pa was substantially detected).

(CDCl$_3$, 500 MHz): 5.43-5.41 (m, 1H), 4.17-4.12 (m, 2H), 2.12-1.97 (m, 2H), 1.75-1.13 (m, 13H)

Synthesis Example 2-2

The diol compound (Compound Pa, 51.7 g, reference material) obtained in Synthesis Example 2-1 was dissolved in CH$_2$Cl$_2$ (300 ml), and the temperature was lowered to 0° C. while stirring. After triethylamine (91.1 g, 125.4 ml, 3 equiv.) and 4-dimethylaminopyridine (7.3 g, 0.1 equiv.) were added, acryloyl chloride (57.0 g, 51.0 ml, 2.1 equiv.) was slowly added thereto. After the addition was completed, the reaction temperature was raised to room temperature and stirred for about 6 hours. After the reaction was completed, the reaction solvent was filtered through a celite pad and the solvent was removed under vacuum. The remaining organic materials were extracted with water and ethyl acetate (EA), and the remaining water in the organic layer was removed using sodium sulfate (Na$_2$SO$_4$). The solids were filtered off and the remaining organic solvent was removed under vacuum to obtain 3,7-dimethyloct-2-ene-1,7-diyl diacrylate (Compound P) at a yield of about 63%.

3,7-dimethyloct-2-ene-1,7-diyl diacrylate (CDCl$_3$, 500 MHz): 6.39-6.02 (m, 2H), 6.01-5.80 (m, 2H), 5.75-5.72 (m, 2H), 5.44-5.37 (m, 2H), 4.69-4.65 (m, 2H), 2.15-2.03 (m, 2H), 1.77-1.23 (m, 13H).

Synthesis Example 3

The mixture of Compound T and Compound P obtained in Synthesis Example 1-3 was separated through chromatography to selectively obtain Compound T.

Synthesis Example 4

Synthesis Example 4-1

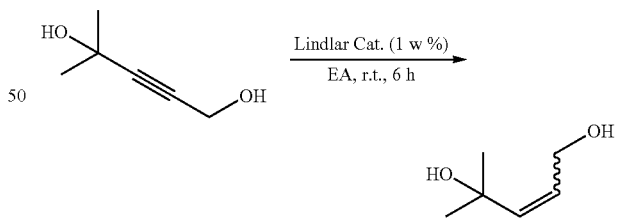

4-methylpent-2-yne-1,4-diol (1 g) was dissolved in ethyl acetate (20 ml) in a 100 ml pressure vessel, and stirred while making nitrogen atmosphere. A Lindlar catalyst (10 mg, 1 w %) was carefully added and the pressure vessel was sealed. All the nitrogen in the pressure vessel was replaced with 5 bar of hydrogen and stirred for about 6 hours. After the reaction was completed, the hydrogen was carefully removed and the solid of the reaction solution was removed through a celite filter. The solvent of the filtrate was distilled under reduced pressure to obtain 4-methylpent-2-ene-1,4-diol (650 mg).

Synthesis Example 4-2

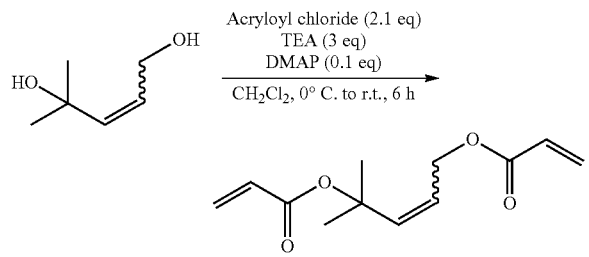

The 4-methylpent-2-ene-1,4-diol (3.5 g, reference material) obtained in Synthesis Example 4-1 was dissolved in $CH_2Cl_2$ (30 ml), and the temperature was lowered to 0° C. while stirring. After triethylamine (9.2 g, 12 ml, 3 equiv.) and 4-dimethylaminopyridine (0.7 g, 0.1 equiv.) were added, acryloyl chloride (5.7 g, 5 ml, 2.1 equiv.) was slowly added thereto. After the addition was completed, the reaction temperature was raised to room temperature and stirred for about 6 hours. After the reaction was completed, the reaction solvent was filtered through a celite pad and the solvent was removed under vacuum. The remaining organic materials were extracted with water and ethyl acetate (EA), and the remaining water in the organic layer was removed using sodium sulfate ($Na_2SO_4$). The solids were filtered off and the remaining organic solvent was removed under vacuum to obtain 4-methylpent-2-ene-1,4-diyl diacrylate at a yield of about 72%.

4-methylpent-2-ene-1,4-diyl diacrylate ($CDCl_3$, 500 MHz): 6.44-6.05 (m, 2H), 6.09-5.86 (m, 2H), 5.75-5.71 (m, 2H), 5.61-5.57 (m, 2H), 4.33-4.22 (m, 2H), 1.39 (m, 6H).

Examples of Preparation of Super Absorbent Polymer

Example 1

100 g of acrylic acid, 123.5 g of 32% sodium hydroxide (NaOH), 0.2 g of sodium persulfate as a thermal polymerization initiator, 0.008 g of diphenyl(2,4,6-trimethylbenzoyl)-phosphine oxide as a photopolymerization initiator, 0.6 g of Compound T obtained in Synthesis Example 1-3, and 55.0 g of water were mixed to prepare a monomer composition having a total solids concentration of 43.8 wt %.

The monomer composition was fed onto a rotating belt having a width of 10 cm, a length of 2 m, and a rotating speed of 50 cm/min at a feed rate of 500 mL/min to 2000 mL/min. While feeding the monomer composition, ultraviolet rays having an intensity of 10 mW/cm² were irradiated to perform a polymerization reaction for 60 seconds. After the polymerization reaction, it was cut by a meat chopper method and dried at 185° C. for 40 minutes using an air-flow oven to prepare a base resin.

Example 2

A base resin was prepared in the same manner as in Example 1, except that 0.6 g of Compound P obtained in Synthesis Example 2-2 was used.

Example 3

A base resin was prepared in the same manner as in Example 1, except that 0.6 g of the cross-linking agent compound obtained in Synthesis Example 3 was used.

Example 4

A base resin was prepared in the same manner as in Example 1, except that 0.6 g of the cross-linking agent compound obtained in Synthesis Example 4-2 was used.

Example 5

A solution prepared by mixing 3.2 g of ultrapure water, 4.0 g of methanol, 0.088 g of ethylene carbonate, and 0.01 g of silica (product name: DM30S) was added to 100 g of the base resin powder prepared in Example 1 and mixed for 1 minute. Then, a surface cross-linking reaction was carried out at 185° C. for 60 minutes. The resulting product was pulverized and classified to obtain a super absorbent polymer having a particle diameter of 150 to 850 μm.

Example 6

A super absorbent polymer was prepared in the same manner as in Example 3, except that the base resin prepared in Example 2 was used in place of the base resin prepared in Example 1.

Comparative Example 1

A base resin was prepared in the same manner as in Example 1, except that 0.26 g of polyethylene glycol diacrylate (PEGDA) was used as an internal cross-linking agent.

Comparative Example 2

A super absorbent polymer was prepared in the same manner as in Example 5, except that the base resin prepared in Comparative Example was used in place of the base resin prepared in Example 1.

Experimental Examples

Evaluation of Pyrolysis of the Base Resin

In order to evaluate pyrolysis at high temperature and a change in absorption ability of the polymer obtained by polymerizing the cross-linking agent compound of the present disclosure and the acrylic acid-based monomer, the super absorbent polymers of the examples and comparative examples were subjected to heat treatment at 185° C., and the change in centrifuge retention capacity over time was measured and is listed in Table 1 below.

(1) Centrifuge Retention Capacity (CRC)

The centrifuge retention capacity (CRC) to a saline solution of the super absorbent polymer can be measured according to EDANA NWSP 241.0.R2.

Specifically, a sample of the super absorbent polymer having a particle diameter of 150 to 850 μm, which is passed through a US standard 20 mesh screen and is kept on a US standard 100 mesh screen, was prepared from a super absorbent polymer to be tested for centrifugal retention capacity.

Thereafter, W0 (g) (about 0.2 g) of the sample having a particle diameter of 150 to 850 μm was uniformly placed into a non-woven bag, and sealed. Then, it was immersed in 0.9 wt % sodium chloride aqueous solution (physiological saline) at room temperature. After 30 minutes, water was drained from the bag by a centrifugal device under the condition of 250 G for 3 minutes, and the weight W2 (g) of the bag was measured. In addition, the same manipulation was performed for an empty bag without the sample, and the weight W1 (g) of the bag was measured.

The CRC was calculated by using the obtained weight values according to the following Equation 1.

$$CRC\ (g/g) = \{[W2\ (g) - W1\ (g)]/W0\ (g)\} - 1 \quad [\text{Equation 1}]$$

In Equation 1,

W0 (g) is an initial weight (g) of the sample having a particle diameter of 150 to 850 μm, W1 (g) is a weight of the empty non-woven bag measured after immersing the non-woven bag without the sample in a saline solution for 30 min at room temperature and dehydrating the same by using a centrifuge at 250 G for 3 min, and W2 (g) is a weight of the non-woven bag with the sample measured after immersing the non-woven bag with the sample in a saline solution for 30 min at room temperature and dehydrating the same by using a centrifuge at 250 G for 3 min.

TABLE 1

|  | Heat treatment time (min, 185° C.) | CRC (g/g) |
|---|---|---|
| Example 1 | 0 | 66.0 |
|  | 20 | 68.0 |
|  | 40 | 69.0 |
|  | 60 | 69.4 |
| Example 2 | 0 | 72.6 |
|  | 20 | 79.6 |
|  | 40 | 81.4 |
|  | 60 | 81.8 |
| Example 3 | 0 | 66.0 |
|  | 20 | 68.0 |
|  | 40 | 69.0 |
|  | 60 | 69.4 |
| Example 4 | 0 | 70.2 |
|  | 20 | 77.3 |
|  | 40 | 79.2 |
|  | 60 | 80.7 |
| Comparative Example 1 | 0 | 50.2 |
|  | 20 | 51.9 |
|  | 40 | 50.6 |

Referring to Table 1, in the case of Examples 1 to 4 in which an acrylic acid-based monomer was cross-linked in the presence of the novel cross-linking agent compound of Chemical Formula 1, when heat treatment was performed at a high temperature (185° C.), the water retention capacity increased with time. This may be because the internal cross-linking structure of the polymer was decomposed by the high temperature to lower the cross-link density.

On the other hand, Comparative Example 1 using the conventional cross-linking agent did not show a significant increase in the water retention capacity with the heat treatment time.

Evaluation of Properties of the Super Absorbent Polymer

The properties of the super absorbent polymers of Examples 5 and 6 and Comparative Example 2 in which surface cross-linking treatment was carried out were evaluated by the following methods.

(1) Centrifuge Retention Capacity (CRC)

The centrifuge retention capacity was measured according to EDANA NWSP 241.0.R2. The specific experimental method is the same as that for the centrifuge retention capacity of the base resin.

(2) Absorbency Under Pressure (AUP)

The AUP at 0.7 psi of each resin was measured according to EDANA method NWSP 242.0.R2.

Specifically, a 400 mesh stainless steel net was installed in the bottom of a plastic cylinder having an internal diameter of 25 mm. $W_0$ (g, 0.90 g) of the absorbent polymer was uniformly scattered on the steel net under the conditions of room temperature and humidity of 50%, and a piston which can provide a load of 0.7 psi uniformly was put thereon. The external diameter of the piston was slightly smaller than 25 mm, there was no gap between the cylindrical internal wall and the piston, and the jig-jog of the cylinder was not interrupted. At this time, the weight $W_3$ (g) of the device was measured.

After putting a glass filter having a diameter of 90 mm and a thickness of 5 mm in a Petri dish having a diameter of 150 mm, physiological saline composed of 0.90 wt % sodium chloride was poured in the dish until the surface level became equal to the upper surface level of the glass filter. A filter paper having a diameter of 90 mm was put thereon. The measuring device was put on the filter paper and the solution was absorbed under a load for about 1 hour. After 1 hour, the weight $W_4$ (g) was measured after lifting the measuring device up.

The AUP (g/g) was calculated by using the obtained weight values according to the following Equation 2.

$$AUP\ (g/g) = [W_4\ (g) - W_3\ (g)]/W_0\ (g) \quad [\text{Equation 2}]$$

TABLE 2

|  | CRC (g/g) | AUP (g/g, 0.7 psi) |
|---|---|---|
| Example 5 | 48.6 | 20.6 |
| Example 6 | 50.6 | 19.4 |
| Comparative Example 2 | 36.9 | 23.7 |

Referring to Table 2, it can be confirmed that the super absorbent polymers of Examples 5 and 6 exhibited remarkably improved water retention capacity and equivalent absorption ability under pressure as compared with the super absorbent polymers of Comparative Example 2.

The invention claimed is:

1. A preparation method of a super absorbent polymer, comprising:
cross-linking an acrylic acid-based monomer having at least partially neutralized acidic groups in the presence of an internal cross-linking agent to form a hydrogel polymer;
drying the hydrogel polymer to form a base resin; and
heating the base resin in the presence of a surface cross-linking agent to perform surface modification to the base resin,
wherein the internal cross-linking agent contains a compound represented by the following Chemical Formula 1:

[Chemical Formula 1]

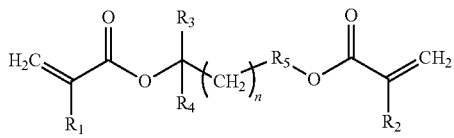

wherein, in Chemical Formula 1,
$R_1$ and $R_2$ are each independently hydrogen or methyl,
$R_3$ and $R_4$ are each independently a C1 to C5 alkyl,
$R_5$ is a linear or branched C1 to C20 alkylene substituted with a linear or branched C2 to C10 alkenyl, or a linear or branched C2 to C20 alkenylene, and
n is an integer of 0 to 10.

2. The preparation method of a super absorbent polymer of claim 1,
wherein $R_1$ and R2 of Chemical Formula 1 are hydrogen.

3. The preparation method of a super absorbent polymer of claim 1,
wherein $R_5$ of Chemical Formula 1 is a linear or branched C1 to C10 alkylene substituted with a C1 to C10 alkenyl, or a linear or branched C2 to C10 alkenylene.

4. The preparation method of a super absorbent polymer of claim 1,
wherein the compound represented by the following Chemical Formula 1 is selected from the compounds represented by the following Chemical Formulae 1-1 to 1-3:

[Chemical Formula 1-1]

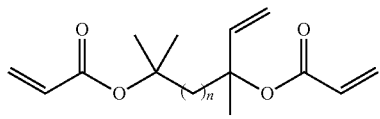

[Chemical Formula 1-2]

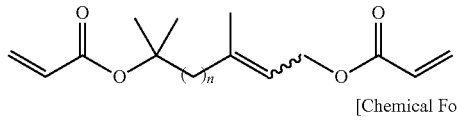

[Chemical Formula 1-3]

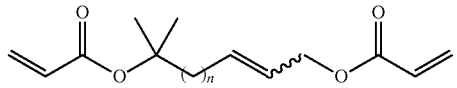

wherein, in Chemical Formulae 1-1 to 1-3, n is an integer of 0 to 10.

5. The preparation method of a super absorbent polymer of claim 1,
wherein the compound represented by the following Chemical Formula 1 is contained in an amount of 1 to 100 wt % based on a total weight of the internal cross-linking agent.

6. The preparation method of a super absorbent polymer of claim 1,
wherein the internal cross-linking agent is contained in an amount of 0.01 to 5 parts by weight based on 100 parts by weight of the acrylic acid-based monomer.

7. The preparation method of a super absorbent polymer of claim 1,
wherein the drying of the hydrogel polymer is carried out at a temperature of 150 to 200° C.

8. The preparation method of a super absorbent polymer of claim 1,
wherein the drying of the hydrogel polymer is carried out for 10 to 100 minutes.

9. The preparation method of a super absorbent polymer of claim 1,
wherein the base resin has a centrifuge retention capacity (CRC) to a saline solution of 50 to 90 g/g.

* * * * *